July 29, 1958   J. H. HAMMOND, JR., ET AL   2,845,620
AERIAL MAPPING AND PROFILING SYSTEM
Filed Feb. 6, 1956   5 Sheets-Sheet 1

Inventors
JOHN HAYS HAMMOND JR
EMORY LEON CHAFFEE

Attorney

July 29, 1958   J. H. HAMMOND, JR., ET AL   2,845,620
AERIAL MAPPING AND PROFILING SYSTEM
Filed Feb. 6, 1956                    5 Sheets-Sheet 2

INVENTORS
JOHN HAYS HAMMOND JR
EMORY LEON CHAFFEE

BY

ATTORNEY

July 29, 1958  J. H. HAMMOND, JR., ET AL  2,845,620
AERIAL MAPPING AND PROFILING SYSTEM
Filed Feb. 6, 1956  5 Sheets-Sheet 3

INVENTORS
JOHN HAYS HAMMOND JR
EMORY LEON CHAFFEE

BY

ATTORNEY

July 29, 1958  J. H. HAMMOND, JR., ET AL  2,845,620
AERIAL MAPPING AND PROFILING SYSTEM
Filed Feb. 6, 1956  5 Sheets-Sheet 4

INVENTORS
JOHN HAYS HAMMOND JR
EMORY LEON CHAFFEE

BY

ATTORNEY

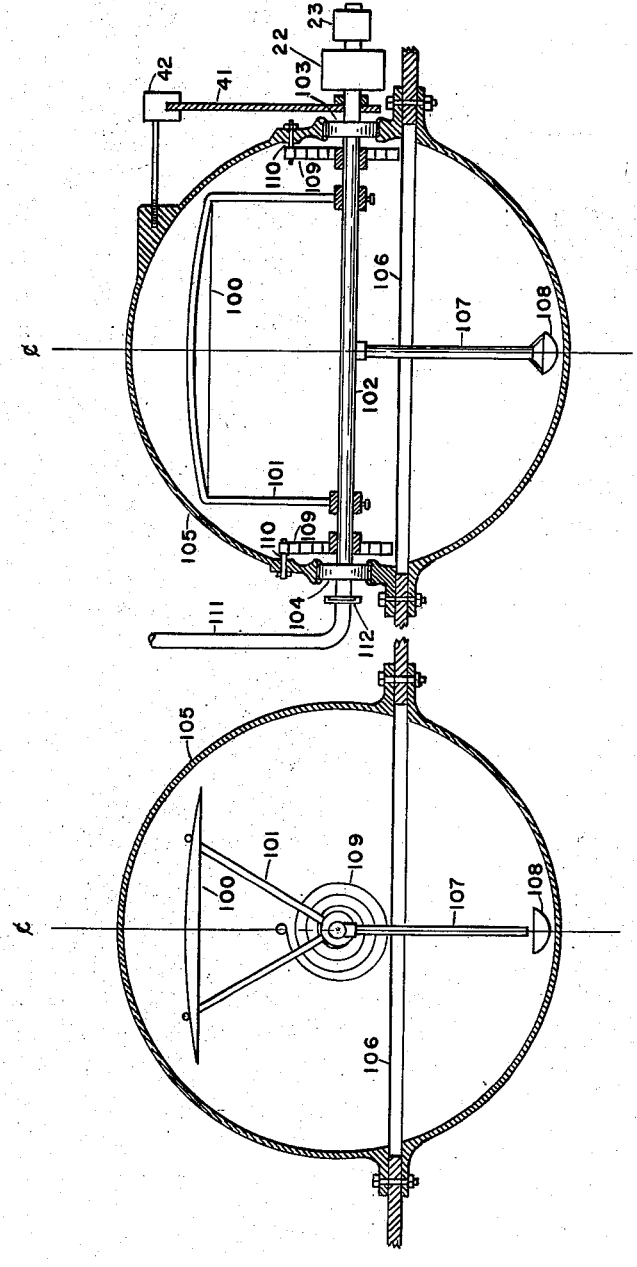

United States Patent Office 2,845,620
Patented July 29, 1958

2,845,620

AERIAL MAPPING AND PROFILING SYSTEM

John Hays Hammond, Jr., Gloucester, and Emory Leon Chaffee, Belmont, Mass.; said Chaffee assignor to said Hammond Application February 6, 1956, Serial No. 563,505

1 Claim. (Cl. 343—11)

This invention relates to methods of aerial surveying and more particularly to a system for obtaining from an airplane a map and elevation of the surface of the earth over a wide strip of the surface along the path of the airplane.

The system which comprises this invention provides means for automatically recording on film data which permits the construction of a map of the strip of the earth's surface over which the airplane flies, the elevation at all points of the strip, and the position of all points of the strip with respect to two or more base stations on the earth's surface.

This system provides means for surveying large areas in a relatively short time, as for example, 3000 square miles in an hour, irrespective of the ruggedness or accessibility of the area surveyed. Furthermore, since the means of surveying is not optical but makes use of microwaves, surveying is not interfered with by clouds or other weather conditions except in so far as the piloting of the airplane may be affected.

The invention comprises in part a microwave generator, a projector, a receiver, and photographic recorders carried in an airplane which flies over the area to be surveyed. The generator produces radar-type pulses of microwave power which are radiated by the projector.

The projector, consisting of a curved mirror, concentrates the microwave beam to a small focal area where the beam strikes the earth's surface. This small focal area is caused to sweep by rotating the projector about a horizontal axis so that the focal area sweeps back and forth in a direction transverse to the direction of flight of the airplane.

Energy reflected from the focal area on the earth's surface is gathered in by the mirror of the projector and is demodulated by the receiver, which is protected during transmission of the pulse by the well known TR switch.

The demodulated pulses control the intensity of the electron beam in a cathode-ray tube while the electron beam is caused to sweep back and forth in synchronism with the corresponding sweep back and forth of the microwave radar beam. The fluorescent spot on the screen of the cathode-ray tube, which varies in brilliance according to the intensity of the reflected beam at the earth's surface, is photographed on a continuously moving film. The resulting impression on the film is a distorted map of the strip of the earth's surface scanned by the microwave beam. Distances on this map must be corrected for range and angle of the radar beam.

The electron beam of a second cathode-ray tube, which gives the profile data, is also caused to sweep in synchronism with the sweep of the micro-wave beam. The electron beam of this second tube is also caused to sweep linearly with respect to time at a much higher speed in a direction perpendicular to the first mentioned sweep and in one direction only with respect to the slow sweep. There may be several hundred high-speed sweeps for every slow sweep. Each high-speed sweep starts at the instant a radar pulse is radiated from the projector or may be delayed by a predetermined time. The returned echo pulse modulates the electron beam of the cathode-ray tube, producing a bright spot on each high speed sweep the position of which gives data from which the range of the reflecting point on the earth's surface from the airplane can be deduced. From these ranges and the angle of the projector the elevation at various points along the sweep path of the microwave beam can be calculated.

The locus of the range points for each slow sweep or every other sweep is photographed on an intermittently advanced film.

The invention also includes a plan position indicator (P. P. I.) of well known construction, which displays on the screen of a third cathode-ray tube the ranges and angles to two or more base stations at which are installed responders or reflectors to provide intense returned pulses.

The pattern on the screen of the cathode-ray tube of the P. P. I. radar is recorded photographically on a film at certain spaced times to give position coordinates of the plane with respect to the base stations. Each position determination is identified on the record of the map tube and on the record of the elevation tube.

The invention also consists in certain new and original features of construction and combinations of parts hereinafter set forth and claimed.

The nature of the invention as to its objects and advantages, the mode of its operation and the manner of its organization, may be better understood by referring to the following description, taken in connection with the accompanying drawings forming a part thereof, in which Fig. 1 is a perspective view showing the scan paths on the ground below the plane;

Fig. 9 is an end elevation of one form of projector assembly embodying the invention;

Fig. 10 is a side elevation of the projector assembly of Fig. 9;

Like reference characters denote like parts in the several figures of the drawing.

In the following description parts will be identified by specific names for convenience, but they are intended to be generic in their application to similar parts.

Figure 1:
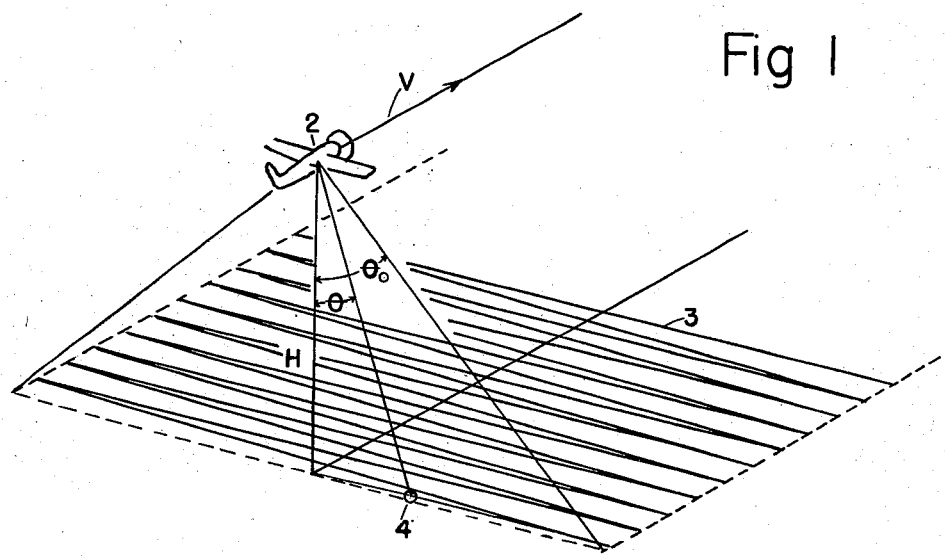

Referring to Fig. 1, an airplane 2 flying with a velocity V at a height H above sea level, scans the earth's surface with a microwave beam in back and forth paths transverse to the line of flight as indicated by lines 3 on the sea-level plane. The maximum angle of scan on either side of the vertical line through the airplane is $\theta_0$, where $\theta_0$ is 45 degrees or more. Thus a strip of the earth's surface below the line of flight of the airplane is scanned which would have a width of $2H \tan \theta_0$ on the sea-level plane.

The microwave beam, which has a finite cross section, strikes the earth's surface below the airplane in an area approximately circular in shape but which becomes more and more elliptical, with the short axis in the direction of flight, as the angle $\theta$ increases. This area of "illumination" on the earth's surface is called the "splash spot" and is shown at 4 in Fig. 1.

The projector of the microwave beam may be any device which provides back and forth scans as shown in Fig. 1, or scans in one direction only. One type of scanner which provides back and forth scans is shown schematically in Fig. 2. This projector will be described in more detail later.

Figure 2:
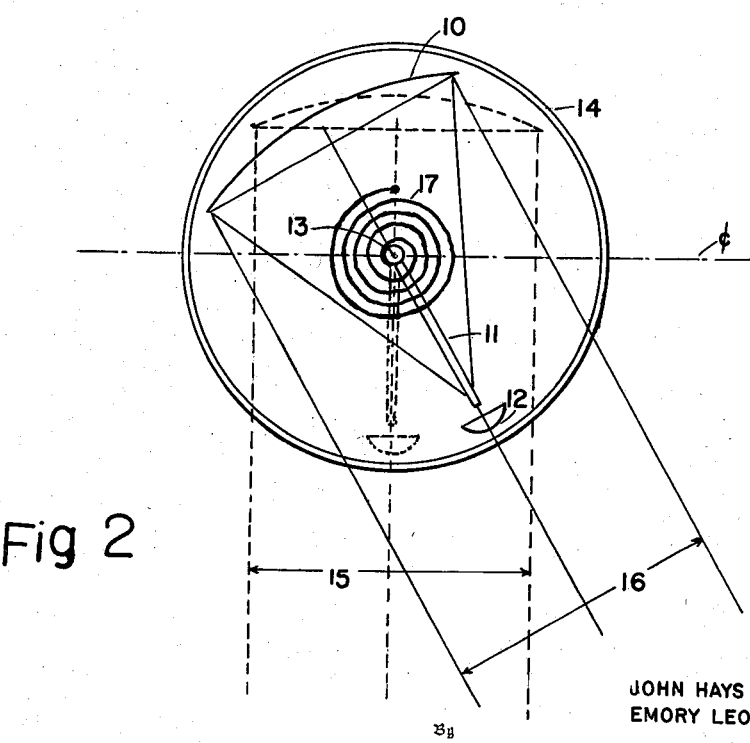
Fig. 2 is a section through the radar projector.

The projector in Fig. 2 comprises a parabolic or spherical metallic mirror 10, the section of wave guide 11 ending at the principal focus of the mirror, and a spherical mirror 12. These parts are mounted as a rigid mechanical system which can rotate about an axis 13 within a plastic spherical housing 14. The microwaves are fed through a circular hole in axis 13 and thence through the radial section 11 of the circular wave guide. The microwaves emanating from the end of guide 11 are reflected by spherical mirror 12 toward the mirror 10. Mirror 10 reflects the waves in a pencil beam shown at 15 when $\theta$ is zero, and at 16 when $\theta$ is 45 degrees.

Spiral springs 17, one on each end of the shaft 13, tune the mirror system to have a certain mechanical period of oscillation which depends upon the velocity V of the airplane and the diameter of the splash spot 4. As an example, a practical value of this natural period is one second for a velocity of 300 miles per hour and a splash spot 300 feet in diameter.

Figure 3:
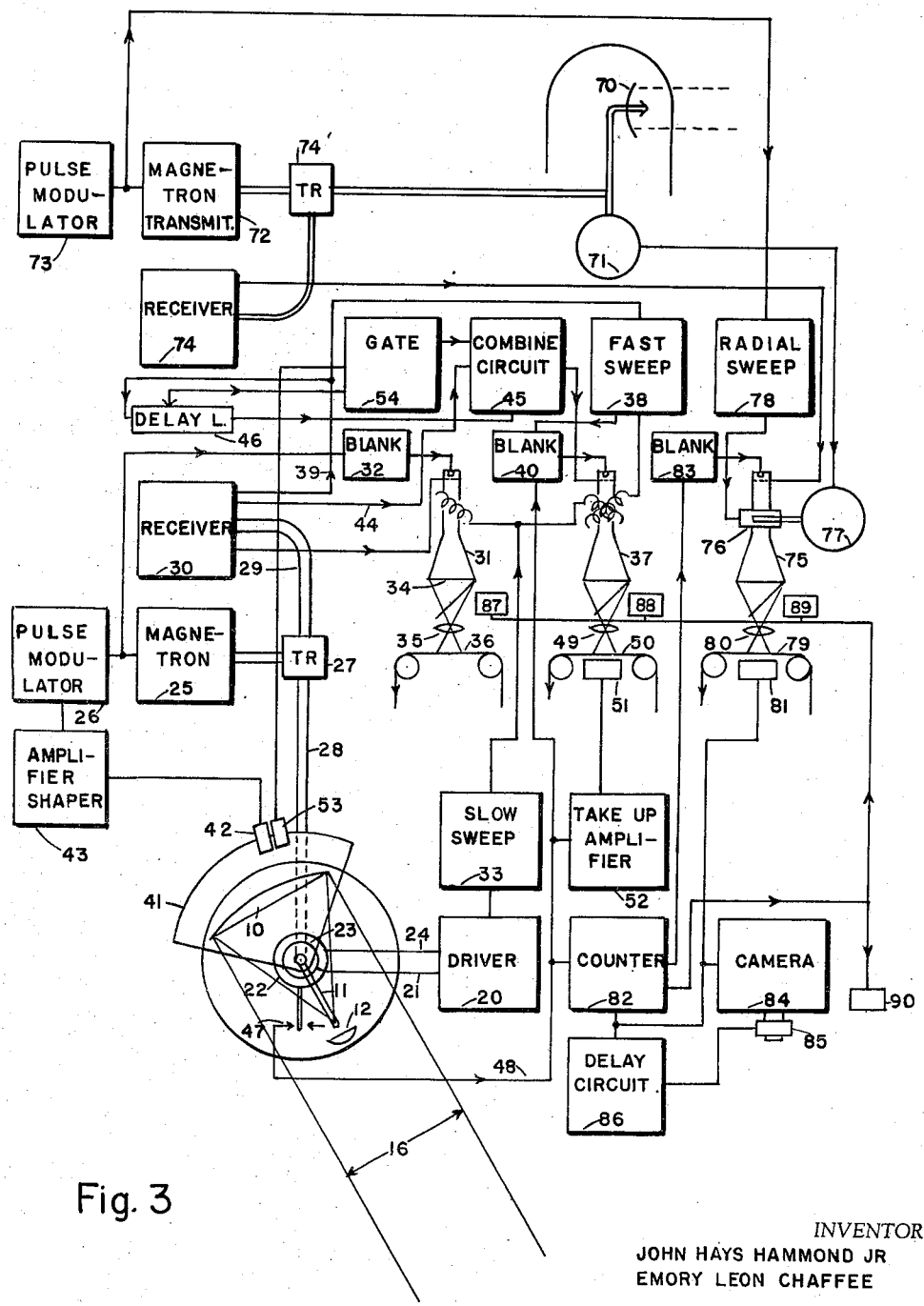
Fig. 3 is a schematic and block diagram of the equipment in the airplane.

The projector and its associated equipment are shown in Fig. 3. Projector 10 is caused to oscillate by the vacuum-tube driver in block 20. This driver tube feeds excitation power through line 21 to electro-mechanical transducer 22. The feed-back power to maintain oscillation is supplied by a second electro-mechanical transducer 23 through line 24 to the driver in block 20.

A magnetron in block 25, which is driven by a pulse modulator in block 26, supplies microwave power through the TR switch in block 27, and then by wave guides 28 and 11, to mirrors 12 and 10 and out by radiation beam 16.

The returned echo pulses, reflected into wave guide 11 by mirrors 10 and 12, are conducted by wave guides 11, 28, and 29 to receiver 30. The TR switch 27 protects the receiver from excessive voltages during the transmission of power from the magnetron in block 25. This TR device is well known and will not be described.

The demodulated echo pulse from the receiver in block 30 modulates the electron beam in cathode-ray tube 31 in accordance with the amount of energy reflected from the earth's surface. The transmitted pulses are prevented from affecting the electron beam in tube 31 by a blanking circuit in block 32, which is controlled by the pulses from the modulator in block 26.

The electron beam in tube 31 is caused to sweep back and forth in synchronism with the sweep of the microwave beam 16 by a sweep generator in block 33 controlled by the driver in block 20.

The trace of the fluorescent spot on screen 34 of tube 31 is focussed by lens 35 on film 36 which is caused to move continuously to the left by a motor drive not shown. The speed of motion may be of the order of $\frac{1}{16}$ inch per second. The variations in intensity of the fluorescent spot on screen 34, in proportion to the reflected energy from the earth's surface, give a record on film 36 resembling a map illustrated in Fig. 4. This map record must be corrected to give a true map of the area scanned as will be explained later.

The ranges to various splash spots which are used both to obtain elevations and to correct the map record, are obtained from a second cathode-ray tube 37. The electron beam in cathode-ray tube 37 is caused to sweep in slow back-and-forth excursions by sweep generator 33.

The sweep of the electron beam in tube 37 is therefore synchronized with the sweep of the electron beam in tube 31 and of the radiation beam 16 from the projector 10.

Figure 5:
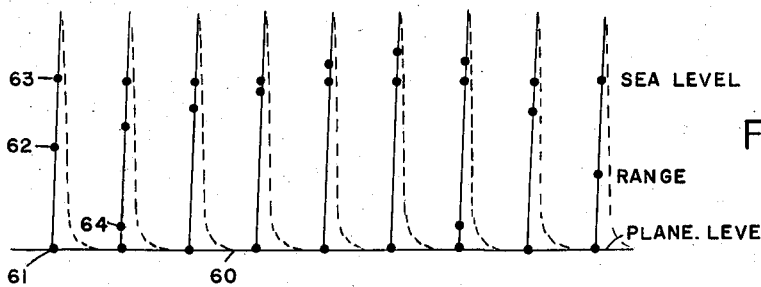
Fig. 5 is a chart showing a small section of the record giving range and elevation along a scan path.

The electron beam in cathode-ray tube 37 is also caused to sweep in a direction transverse to the slow sweeps. There are a hundred or more such high-speed sweeps for each slow sweep. These high-speed sweeps are shown in Fig. 5 on a small section of the slow-speed scan 60 greatly expanded in length. Each high-speed sweep is linear with respect to time during the rise, the retrace, shown dotted, being blanked. The time for each rise may be changed as the altitude of the airplane changes. For an altitude of 30,000 feet the rise time should be about 100 microseconds.

These high-speed sweeps are produced by a sweep generator in block 38, which is controlled from receiver 30 through line 39 so that a sweep starts at the same instant a radiation pulse is emitted from projector 10. As explained the retrace is blanked by circuits in block 40, controlled by the sweep generator in block 38.

The timing of the radiated pulses is important in facilitating the calculations of the true positions and elevations. The modulating pulses from pulse modulator 26 are timed so that a pulse of radiation is emitted each time the angles $\theta$ of rotation of projector 10 increases or decreases by a certain amount. For example, a pulse may be emitted at every degree of rotation of projector 10. By this arrangement any angle $\theta$ of rotation of projector 10 from the vertical direction of projection can be found by counting the number of high-speed pulses. The timing of the emitted pulses in the manner just described is accomplished by a sector disk 41 mounted on the shaft of projector 10, and a stationary electromagnetic pick-up device 42. Pick-up 42 receives pulses from recorded magnetic effects on the disk 41 or from teeth or iron inserts in the edge or surface of disk 41 spaced at equal angular intervals. These timing pulses are shaped and amplified by circuits in block 43 to adapt them to the control of the pulse modulator in block 26. By means of this timing system the high-speed pulses in Fig. 5 are spaced in accordance with the angle of displacement of projector 10.

Each transmitted pulse of radiation to a small degree leaks through the TR switch 27 and produces a pulse in receiver 30. These pulses cause an increase in intensity of the electron beam in cathode-ray tube 37 producing dots shown at 61 in Fig. 5 at the start of each high-speed sweep. The radiation pulse reflected from the earth's surface, acting through receiver 30, line 44, and combining circuits in block 45, causes the fluorescent spot to intensify producing range dots as at 62 in Fig. 5.

The pulse at the instant of transmission of the radar beam is led from line 39 through a delay line in block 46, where it is delayed by a time equivalent to the range to sea level. These delayed pulses are led through combining circuits in block 45 to the modulating grid of tube 37. The dots produced by these pulses are illustrated in dots 63 in Fig. 5. The delay time may be automatically varied by a control of the pick-off point on delay line 46 by a precision aneroid barometer so always to correspond to the altitude H of the airplane above sea level.

The cathode ray in tube 37 is blanked during the sweep in one direction, say to the left, of radiation beam 16 by a contactor 47 attached to the shaft of projector 10 which closes when there is any rotational movement of the shaft of the projector 10 in the clockwise direction. The circuit through line 48 acts upon the blanking circuit in block 40 so as to suppress the electron beam in tube 37 as explained.

The pattern on the screen of tube 37 is focussed by lens 49 onto film 50. Film 50 is caused to move intermittently by a mechanism in block 51, the pull-up taking place while the radiation beam 16 is sweeping to the left when tube 37 is blanked. The mechanism in block 51 is actuated by the pulse produced by contacts 47 amplified by circuits in block 52. The record is made while the film is stationary and during the sweep of radiation beam 16 to the right.

In order to aid in identifying the angle $\theta$ for any high-speed sweep, additional signals are taken from sector disk 41, or from a second disk, by pick-up device 53, which controls gate circuits in block 54. The gate circuit in block 54 permits the pulses at the instant of transmission when $\theta$ is zero and for every tenth transmitted pulse thereafter corresponding to every 10 degrees of rotation of projector 10, to pass through combining circuit 45 to the modulating grid of tube 37. These pulses are, however, delayed by say 5 microseconds by a portion of delay line 46 so as to appear on the high speed sweeps a short distance from their beginning. Such angle identifying marks are shown as dots 64 in Fig. 5.

Figure 6:
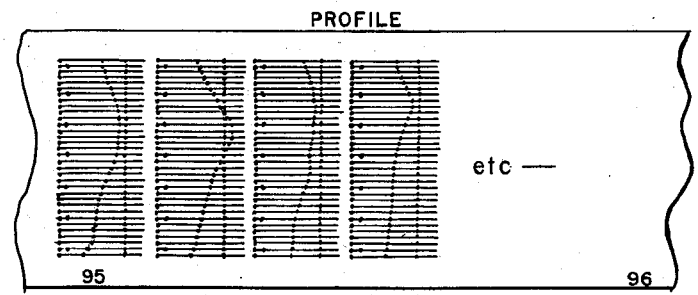
Fig. 6 is a chart illustrating the type of elevation record obtained.

The type of record on film 50 giving elevation data is shown in Fig. 6. An exposure is made every half second. The film in this case would advance 0.70 inch each second.

Figure 4:
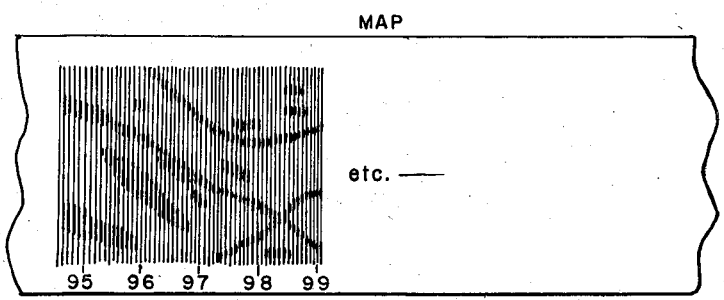
Fig. 4 is a chart illustrating the type of map record obtained.
Figure 7:
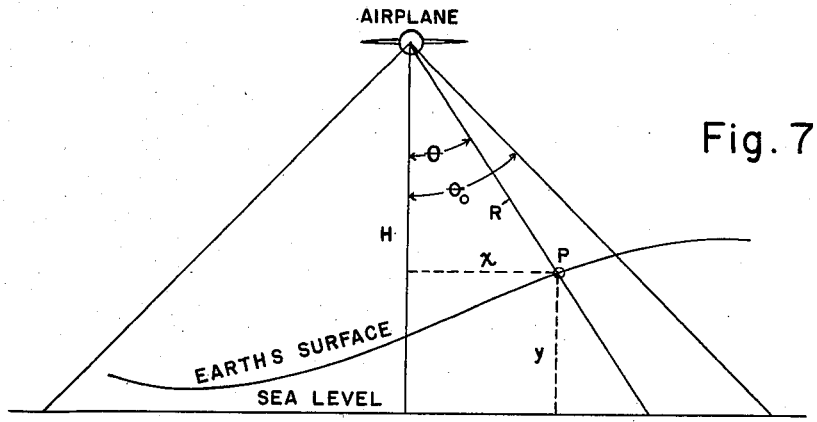
Fig. 7 is a diagram showing the relations between the recorded data and the true elevation and true location of a point on the earth's surface.

The relations of the quantities determined directly from the records of Figs. 4 and 6 and the quantities desired are shown in Fig. 7, which represents a vertical plane through the airplane and perpendicular to the line of flight. Here the altitude H, range R, and angle $\theta$ are given directly by the range records shown in Fig. 6 and represented also by Fig. 5. In Fig. 7, point P represents the instantaneous position of the point of reflection on the surface of the earth. The altitude H is known from the barometer and is indicated by distance H in Figs. 1 and 7. The angle $\theta$ is determined by counting reference dots for 10° intervals and interpolation for fractions of 10° intervals. The range R is determined by multiplying the altitude H in feet by the ratio of distances R to H as measured on Fig. 5 or Fig. 6. Then the true distance $x$ of point P from the vertical is $$x = R \sin \theta$$

and the true elevation of point P is $$y = H - R \cos \theta$$

The values of $x$ enable the map record shown in Fig. 4 to be corrected to give true locations of the various details recorded, and both $x$ and $y$ give data for constructing true profiles for each slow-sweep record.

Position indication for any record is provided by a P. P. I. radar system used in conjunction with some established base stations.

The P. P. I. projector 70 in Fig. 3 is rotated by servo motor 71 at a rate of about one revolution per second. The projector is fed from magnetron transmitter 72, which is modulated by pulse modulator 73 at a repetition rate of about 1000 pulses per second. The echo pulses are received by receiver 74, protected during transmission by TR switch 74'. The rectified pulses from receiver 74 modulate the electron beam in cathode-ray tube 75 in a well known manner. The radial deflection yoke 76 is rotated in synchronism with projector 70 by servo transformer 77. The radial sweep of the P. P. I. tube 75 is provided by a sweep generator in block 78 controlled by the pulses from the modulator in block 73.

Base stations, whose positions are established astronomically or by means of the system here described, are located at a distance L from each other. The distance L between each pair of stations need not be identical but must not be greater than the range of the radiation from projector 70. If microwaves are used in the P. P. I. system, L may be of the order of 200 miles if H is around 30,000 feet, but L may be greater if longer wave lengths are used in the P. P. I. system.

A responder of well known design, which need not be attended, or corner reflector mounted on a pole, is installed at each base station automatically to increase the intensity of the returned pulse from the airplane. The distance to each base station is given by the time delay of the returned pulse. This time delay, as well as the approximate angle for each base station, appear on the screen of cathode-ray tube 75 and are recorded on film 79 by lens 80.

The film 79 is advanced intermittently by one picture space say every 10 oscillations of projector 10, which is once every 10 seconds, by a mechanism in block 81. The pull-up pulses for block 81 is supplied by a counter in block 82 controlled by the one-second pulses in line 48. A blanking circuit in block 83, controlled by the counter in block 82, blanks the P. P. I. tube 75 for all time except during the one sweep in ten of projector 10 when the P. P. I. pattern on tube 75 is to be recorded.

Figure 8:
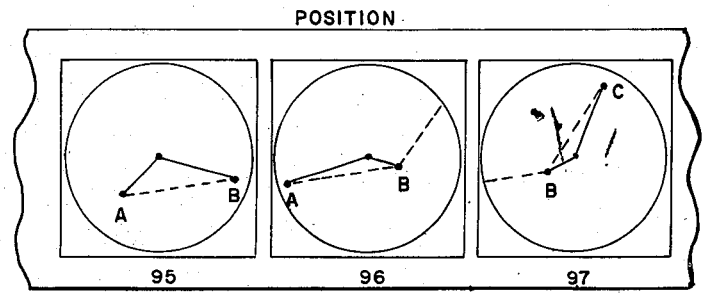
Fig. 8 is a detail view illustrating the type of record giving the positions of the airplane.

The type of record, provided every 4400 feet, if the plane has a speed of 300 miles per hour and the frequency factor is 10, as assumed, is shown in Fig. 8. The angular positions of the airplane with respect to the base stations, though given on the record are less accurate than the distances. These distances can be used to determine accurately the instantaneous position of the airplane at each exposure.

By adjusting the bias of the blanking wave supplied by block 83 to the P. P. I. tube 75, a P. P. I. map of the surrounding area can be recorded simultaneously with the position data of Fig. 8.

An aerial camera 84 may also be provided to give visual detail to supplement the data obtained by the three film records of Figs. 4, 6, and 8. The shutter 85 of the camera 84 can be actuated automatically by the ten-second pulses from the block 82 with a suitable time delay provided by the circuit in block 86. The film advance in camera 84 is controlled by pulses from block 82, in unison with the advance of film 79.

In order to identify simultaneous records of the three kinds shown in Figs. 4, 6, and 8, and the camera picture, four numerical counters 87, 88, 89, and 90 are advanced one number every 10 seconds by the counter circuit in block 82. These numerical counters are placed in a suitable optical position so as to record the consecutive numbers on the margin of each film record as shown by the numbers 95 and 96 in Figs. 4, 6, and 8, and on the margin of the camera photograph not shown.

Figure 11:
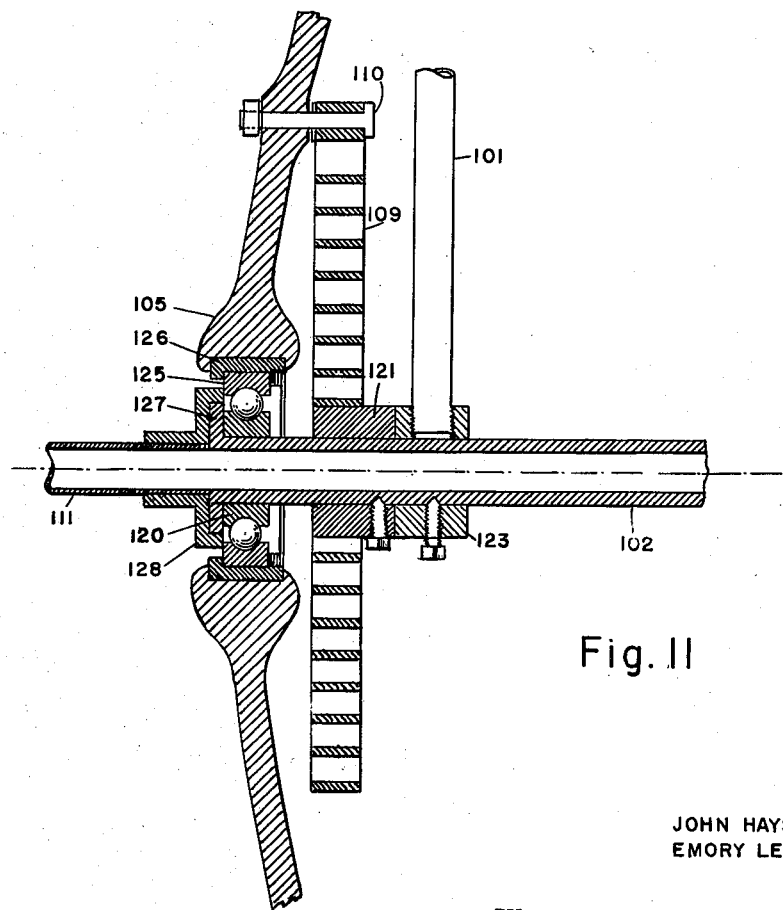
Fig. 11 is a detail view showing one of the bearings of the projector.

A practical embodiment of projector 10 is shown in detail in Figs. 9 and 10, with details of certain parts of the projector shown in Fig. 11. In describing the particular embodiment specific dimensions are given for illustration but it is understood that the dimensions and other specific data may have other values and be within the scope of this invention.

Referring to Figs. 9 and 10, a spherical or parabolic mirror 100 having a diameter of about 3½ feet and having a focal length of about 4 feet, is mounted on an aluminum cradle 101 which is rotatably supported on shaft 102. Shaft 102 rotates in two bearings 103 and 104 rigidly mounted at opposite ends of the diameter of a plastic spherical shell 105 having an internal diameter of about 5¼ feet. The plastic spherical shell is made in two parts which are bolted together at the plane 106. Plane 106 is about 7 inches below the center line of shaft 102 and is preferably the plane of a stabilized platform co-planar with the bottom of the fusilage of the airplane.

A section of circular wave guide 107 extends radially outward from the center of the shaft 102 and ends at the focus of mirror 100. A small spherical mirror 108 rigidly affixed to wave guide 100, is located with its center of curvature at the opening of the wave guide 107. This mirror reflects the microwaves emerging from the end of wave guide 107 onto mirror 100. This mirror may be omitted by bending wave guide 11 so that its open end faces mirror 10.

Two spiral springs 109 are rigidly mounted at their central ends on shaft 102. The outer ends of springs 109 are rigidly affixed to the plastic shell at points 110. The strength of the springs and the moment of inertia of the mirror system are such as to give a natural period of oscillation of the rotatable system of about one second.

The wave guide channel of tube 107 is continued through the center of shaft 102 and through the center of bearing 104 communicating with external wave guide 111 in a rotating junction 112. The inside surface of steel shaft 102 may be copper plated to reduce the attenuation of the transmission of the microwave power through the wave guide.

Figure 11 shows details of bearing 104 and associated parts. The steel shaft 102 is a steel tube, the internal hole serving as a wave guide. Rigidly mounted on this steel shaft are the inner race 120 of a ball bearing, the inner end member 121 of spiral spring 122, and one end 123 of the cradle 101. The outer end of spring 122 is attached to the plastic shell by pin 110. The outer race 125 of the ball bearing tightly fits into the cup 126 which is rigidly mounted in the plastic shell 105. A collar 127 is mounted rigidly on the end of shaft 102 and rotates within an articulating cupped collar 128 mounted on the end of the stationary wave guide 111. The surface between collars 127 and 128 is lubricated but furnishes capacitive coupling between the two sections of the wave guide.

The bearing at the other end of the shaft is the same as that shown in Fig. 11 except that there is no wave guide connection and shaft 102 extends a distance beyond the bearing for mounting timing disk 41, and transducers 22 and 23.

What is claimed is:

An aerial survey system comprising a transmitter to be carried by an airplane, said transmitter including means for generating and projecting downwardly a radar-type beam, means for oscillating said beam in a path transverse to the line of flight of the airplane to scan thereby the terrain within a wide strip along said line of flight, a receiver responsive to the energy of the beam reflected from the scanned area including a cathode-ray tube, means for causing the beam in said tube to sweep in synchronism with said radar beam and to vary in strength according to said received reflected energy so as to produce a trace representing the reflection characteristics of the scanned area, said transmitter having means producing radar pulses at known intervals along the sweep path, a second cathode-ray tube having an electron beam, means for causing said last beam to sweep in synchronism with the radar sweep, and means producing a transverse sweep of said last beam corresponding to each of said pulses and means producing an indication on the trace of said transverse sweep having a displacement which is proportional to the range of the reflecting area, a radar-type position indicating device to be carried by said airplane, means producing periodic position indications, means making recordings of said cathode-ray traces and means indicating on said recordings the times of successive position indications.

References Cited in the file of this patent
UNITED STATES PATENTS

| | | |
|---|---|---|
| 2,605,463 | Hirschberg et al. | July 29, 1952 |
| 2,610,320 | Hall | Sept. 9, 1952 |
| 2,616,077 | Holser | Oct. 28, 1952 |
| 2,633,570 | Greenwood | Mar. 31, 1953 |
| 2,720,029 | Eliel | Oct. 11, 1955 |